Patented Aug. 30, 1949

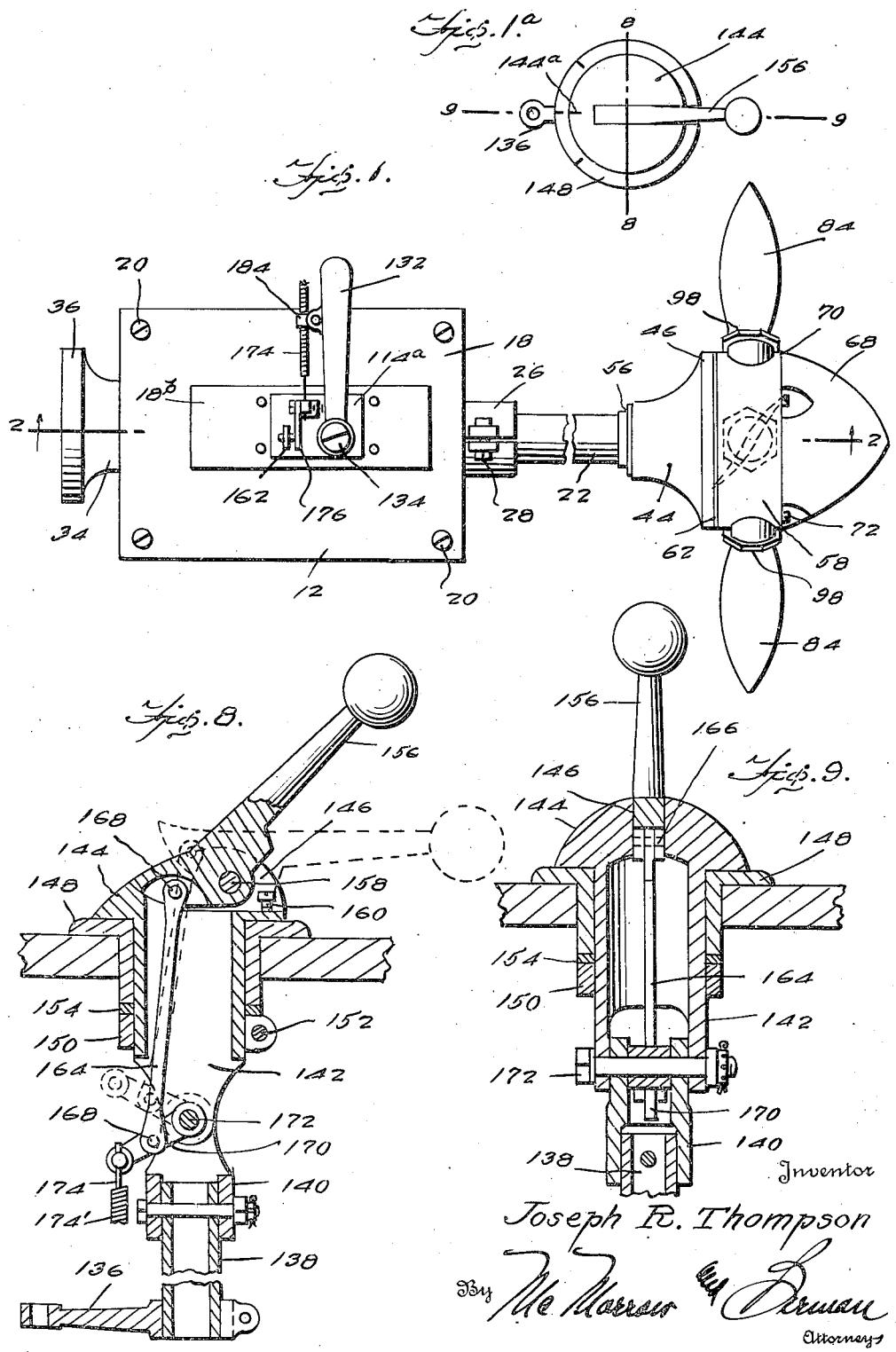

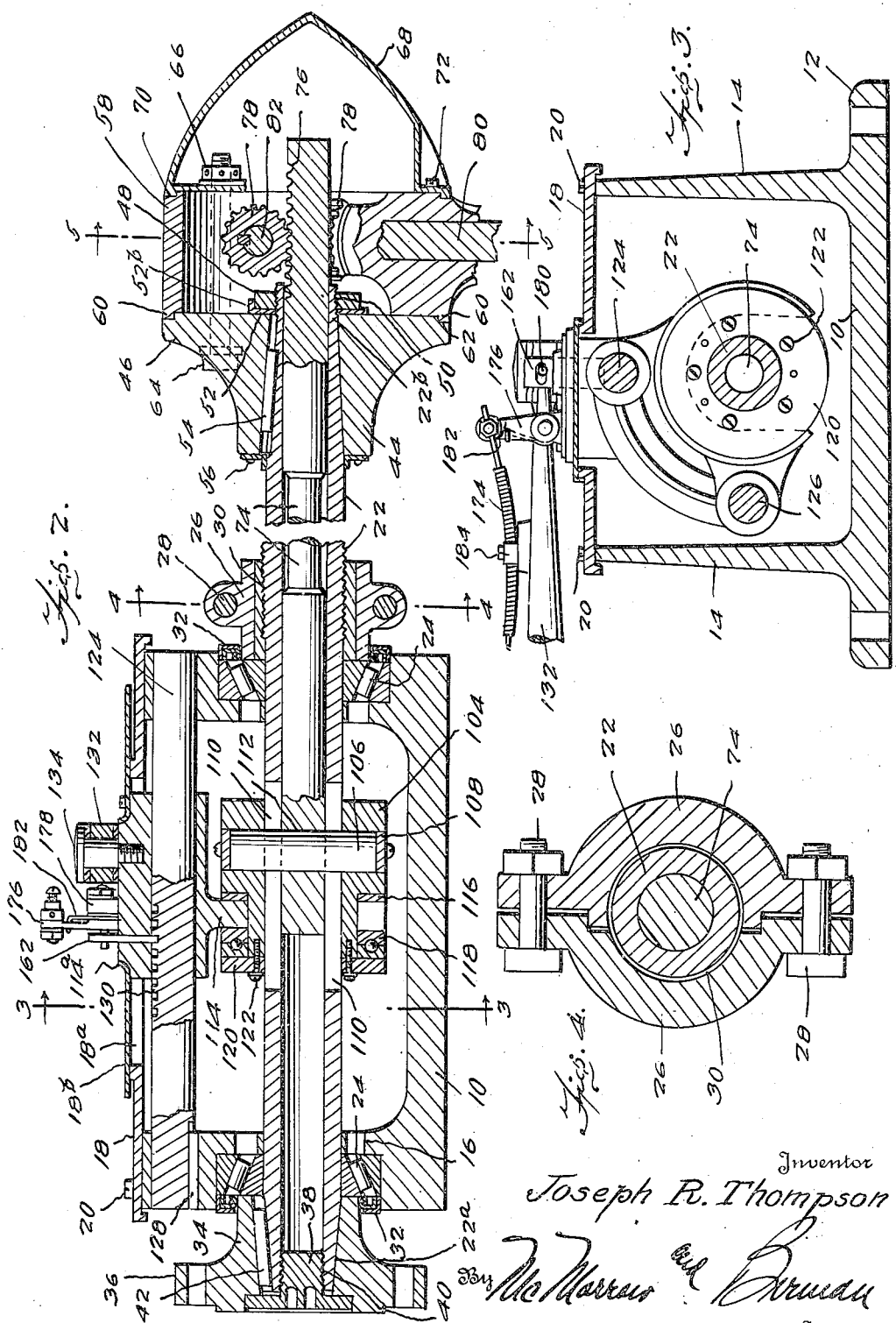

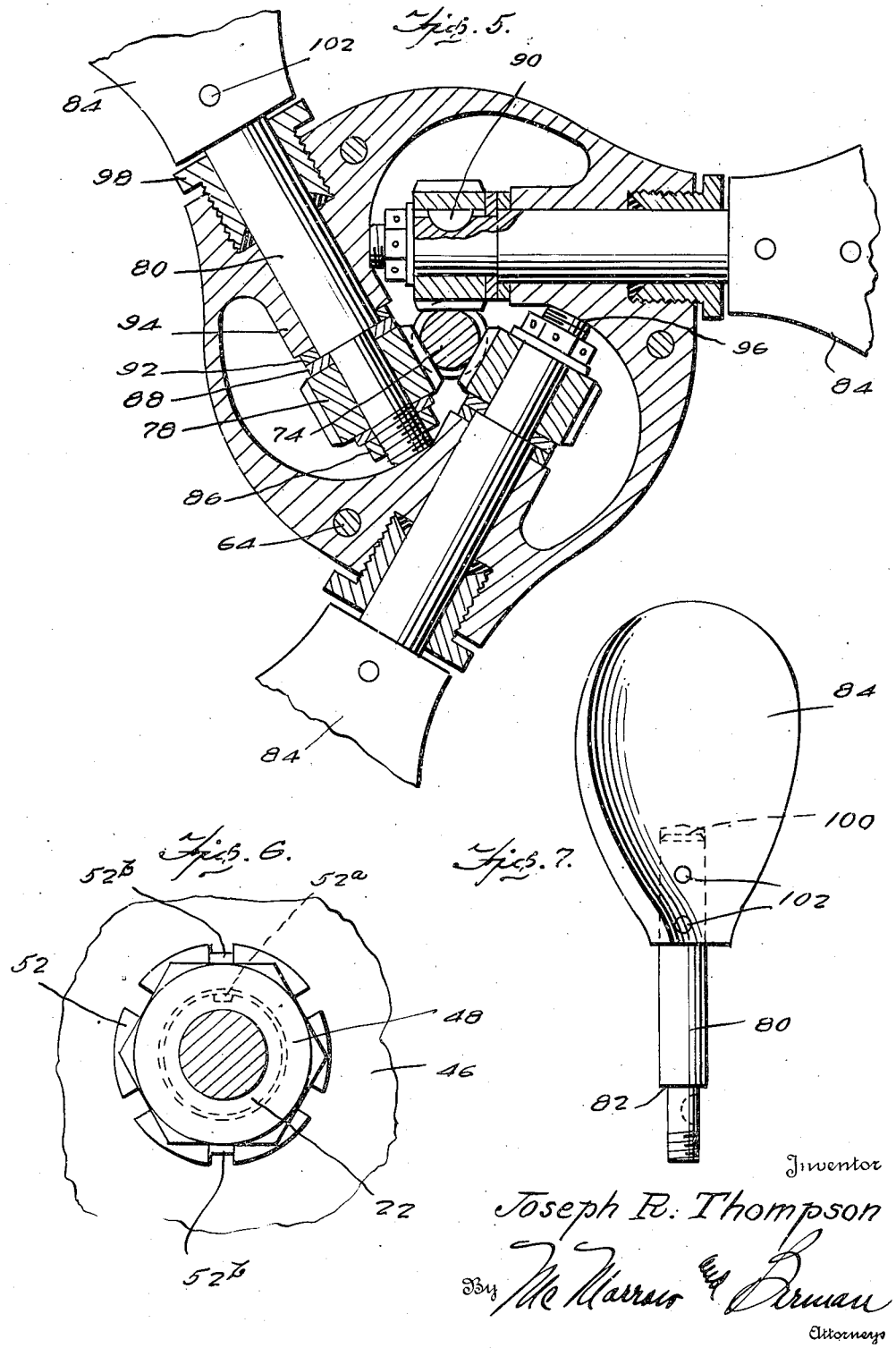

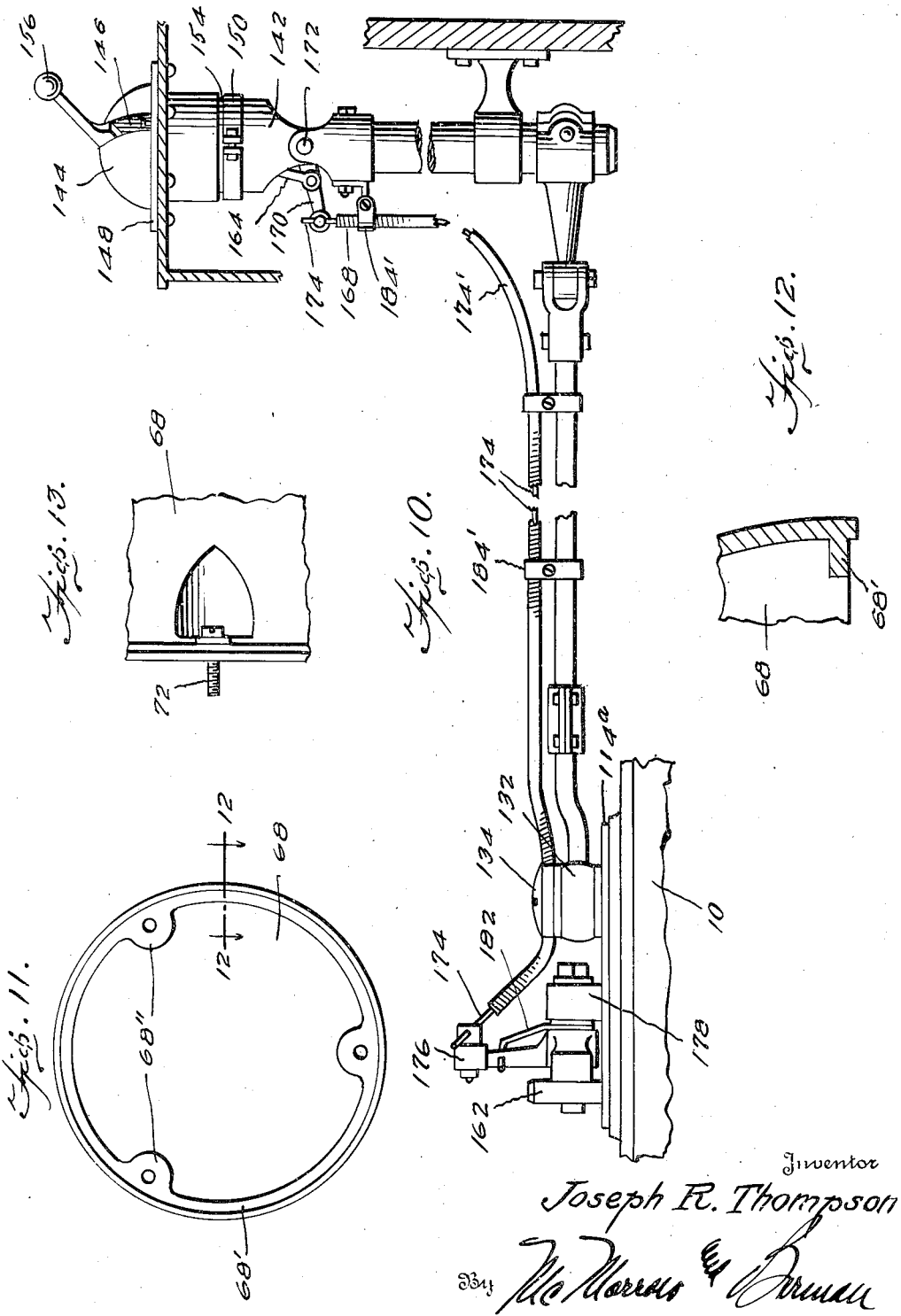

2,480,521

UNITED STATES PATENT OFFICE 2,480,521

POWER DRIVE AND CONTROL MECHANISM

Joseph R. Thompson, Cranston, R. I.

Application March 16, 1945, Serial No. 583,098

2 Claims. (Cl. 74—471)

The invention appertains to improvements in power drive and control mechanisms, and has for one of its several objects and advantages, to provide an extremely simplified and appreciably less expensive type thereof, having a more or less general application, either for use as an independent unit, or in conjunction with other mechanical assemblies, such as those employed for air and marine propulsion, or in industrial operations involving the handling, controlling, and processing of air, liquids, gases, powders, and similar materials, eliminating the need for conventional reduction and reversing gear and clutch mechanisms, common to such assemblies, and operating with a much greater economy, efficiency, and smoothness.

Another object of the invention has to do with the provision of a novel, practical and efficient, power drive and control mechanism, particularly designed for driving and controlling a variable pitch propeller, for either air or water craft propulsion, an accurate adjustment in the pitch of the blades of the propeller being effected through a remote control, located at the pilot's or navigator's post of command.

A further object of the invention lies in the provision of the improved power drive and control mechanism, wherein one of the mechanical refinements thereof is resident in a locking device for securing the elements of the mechanism in selected positions of adjustment, the same being located close to sources of vibration, which might develop during unusual operating conditions, so as to prevent the transmission of such vibrations to the control linkage and also any inaccuracies due to lost motion, if any developes in the control linkage after prolonged service.

Yet another object of the invention is to provide the improved power drive and control mechanism with certain mechanical refinements which make for a rugged and smooth running construction, facility in assembly and disassembly of parts, and assurance of proper alignment, with the use of simple tools by persons of limited mechanical experience.

With these and other objects and advantages of equal importance in view, the invention resides in the certain new and useful combination, construction, and arrangement of parts, as will be hereinafter more fully described, set forth in the appended claims, and illustrated in the accompanying drawings, in which:

Figure 1 is a top plan view of the variable pitch propeller drive assembly, in accordance with the invention;

Figure 1a is a similar view of the remote control assembly per se;

Figure 2 is an enlarged, vertical, longitudinal section, taken through the line 2—2 on Figure 1, looking in the direction of the arrows;

Figure 3 is an enlarged, vertical, transverse section, taken through the line 3—3 on Figure 2, looking in the direction of the arrows;

Figure 4 is a sectional view similar to that of Figure 3, but taken through the line 4—4 on Figure 2, looking in the direction of the arrows;

Figure 5 is another similar sectional view, but taken through the line 5—5 on Figure 2, looking in the direction of the arrows;

Figure 6 is an enlarged, vertical, transverse, sectional detail, taken through the propeller blade control shaft, and showing the drive shaft, a fragment of the hub mounting flange, and the flange-to-shaft locking nut, in end elevation;

Figure 7 is a side elevation of one of the propeller blades and the shaft mounting therefor;

Figure 8 is an enlarged, vertical section, taken through the line 8—8 on Figure 1a, looking in the direction of the arrows;

Figure 9 is a sectional view similar to that of Figure 8, but taken through the line 9—9 on Figure 1a, looking in the direction of the arrows;

Figure 10 is a side elevation, showing a tentative assembly of the operative connections between the controller and the propeller blade pitch adjusting mechanism;

Figure 11 is an elevation of the forward end of the fairing cap;

Figure 12 is an enlarged, fragmentary section, taken through the line 12—12 on Figure 11, looking in the direction of the arrows; and Figure 13 is an enlarged, fragmentary detail of the fairing cap, showing one of the recesses to house the head of a screw for securing the cap in place.

Referring in detail to the drawings, wherein like characters of reference denote corresponding parts in the several views, the improved power drive and control mechanism, as it is exemplified therein in connection with a variable pitch marine propeller assembly, is comprised in a drive shaft 22, supported in tapered roller bearings 24, mounted in the ends of a transmission case, which is open at its top side and made up of a bottom wall 10, side walls 14, end walls 16, and a removable cover plate 18, secured on the open top, by means of screws 20; the bottom wall 10 having apertured side flanges 12, for the bolting of the transmission case in a desired position of support.

The tapered roller bearings 24 serve to take both the radial and longitudinal thrust of the drive shaft 22; the end thrust, when the shaft is driving forward, being taken on the inner race of the rear of the bearings, from the forward face of a split thrust collar 26, secured on the drive shaft by bolts 28, and the end play in the drive shaft is also adjusted at this point, by loosening up on the bolts 28 and turning the collar on threads 30, cut in itself and in the drive shaft, thus pulling the collar to and away from the inner race, to the position of desired adjustment. When properly adjusted, the collar 26 is securely locked in place by tightening up on the bolts 28; the threads 30 preventing any dislocation of the collar on the shaft by the driving thrust thereof. Oil retainers 32 are placed over the outer sides of the roller bearings 24, to retain a lubricant within the transmission case and prevent entrance thereto of any foreign matter. The reverse driving thrust of the drive shaft 22 is taken on the inner race of the forward of the roller bearings 24, from the hub 34, of a power coupling flange 36; the hub being secured on the forward end of the shaft, by means of a retaining screw 38, which is screwed tightly into threads 40, provided for it in the shaft end; it being here noted that the shaft 22 is made from tubular stock and has its forward end tapered, as at 22a. Turning of the power coupling flange 36, on the drive shaft, is prevented by a key 42, fitted into complementally formed keyways in the hub 34 and the shaft.

The rear end of the drive shaft 22, beyond the thrust collar 26, is similarly tapered, as at 22b, to receive the hub portion 44, of a mounting flange 46, for a propeller blade and spindle housing assembly; the hub portion 44 being secured in place by means of a flange-to-shaft lock nut 48, which is screwed on the shaft end, at threads 50, against a lock washer 52, and otherwise prevented from turning on the shaft by a key 54, seated in complemental keyways, formed in the drive shaft 22 and the hub portion 44; the lock washer 52 being likewise prevented from turning on the shaft end, by means of a lug 52b (Figure 6) engaged in a keyway, formed as a continuation of one of the keyways in which the key 54 is engaged. After the lock nut 48 is tightened in place, one or more of lugs 52a, formed on the outer edge of the lock washer 52, are bent firmly down onto one or more of the flats on the lock nut, thus preventing the loosening of the latter on the shaft and assuring of a constant tightness of the mounting flange 46. An annular seal element 56 is engaged about the drive shaft 22 and secured in place against the forward end of the hub portion 44, of the mounting flange 46, to prevent ingress of water along the shaft and the keyways.

Supported from the mounting flange 46, is a spindle housing 58, which is aligned therewith by ridges 60, turned on their opposed surfaces, and secured to it, together with an interposed water seal gasket 62, by fitted bolts 64, having lock nuts screw threaded onto the rearwardly directed ends thereof, substantially as shown in Figure 2. Similarly aligned and secured to the rear end of the spindle housing 58, together with an interposed water seal gasket 70, is a substantially conical fairing cap 68, which is secured in place by screws 72.

Extending rearwardly from within the tubular drive shaft 22, is a control shaft 74, which has its rear end projecting into the spindle housing 58 and provided with gear rack teeth 76, milled in its surface, as best shown in Figure 2. The gear rack teeth 76 are disposed in mesh with pinions 78, mounted on the radially extending spindles 80, of several propeller blades 84, three of which are illustrated for purposes of the present description. Each of the pinions 78 is secured on the inner end of a spindle 80, by a castellated nut 86 and a key 90 (Figure 5); the pressure of the nut 86 against the pinion securely locks it, together with an interposed washer 88, against a shoulder 82 (Figure 7); the washer 88 having bearing against a thrust washer 92, seated on the spindle and, in turn, bearing against a bearing boss 94, formed with and interiorly of the spindle housing 58. The inward end play of each spindle 80 is stopped by the spindle housing 58, at point 96, while the outward play thereof is stopped by the thrust washer 92. The end play of each spindle 80 is adjusted by simply varying the thickness of the thrust washer 92, as it well understood. The blade spindles 80 revolve freely in their respective bearing bosses 94 in direct relative response to the motion of the control shaft 74, the operation of which will be presently fully explained. A water seal is provided at the outer end portion of each spindle 80, it taking the form of a packing gland 98, which is screw threaded inwardly of the spindle housing 58, substantially as shown in Figures 1 and 5.

Each propeller blade 84 is attached to its spindle 80 by means of a socket 100 and rivets 102, when the blade itself is of a cast metal construction. When a formed sheet metal blade is employed, it is to be held securely on the outer end of the spindle, by having its root end inserted into a slot milled through the diameter of the spindle end and secured in place by the rivets 102. The use of a sheet metal blade is of practical value, due to its ease and economy of replacement, particularly when a blade of a different size or type is desired and, also, when one or more of the blades is accidently damaged while in service.

Mounted on the drive shaft 22, within the transmission case 10, is a sleeve 104, having a spline key 106 passed diametrically through the same and through aligned slots 110, formed longitudinally in the drive shaft, and a slotted aperture 112, formed in the forward end portion of the control shaft 74; the key being held in place by clamp elements 108 (Figure 2). The forward end of the sleeve 104 is circumferentially reduced and engaged by a yoke 114, which rides the reduced portion between thrust washers 116, 118; the thrust washer 118 preferably taking the form of a race element of a ball bearing assembly, the latter being secured in place by a clamp ring 120, fastened against the reduced end of the sleeve 104, by means of screws 122. The connected end of the yoke 114 is substantially arcuate in form and provided with an aperture adjacent each end of that portion, for the passage therethrough of slide rods 124, 126, which are secured in the ends of the transmission case 10, by means of set screws (not shown) and a key 128. The yoke 114 is positioned on the sleeve 104, with the slide rod 124 uppermost and this rod has its top surface milled to provide a plurality of locking slots 130. The cover plate 18, of the transmission case 10, is longitudinally slotted, as at 18a, in line with the medial portion of the slide rod 124 and this slotted opening is closed by a supplemental cover plate 18b, carried on a shouldered top portion 114a, of the yoke 114, which top portion projects upwardly through the opening 18a, to that end, substantially as shown in Figures 2 and 3.

The pitch of the propeller blades 84 is to be adjusted by directional movements imparted to the control shaft 74 from a remote control station, through mechanical connections between the station and the yoke 114, one set of which connections effects the locking and unlocking of the yoke and the other the shifting of the yoke and, through it, the control shaft 74 and the blade spindles 80, when the yoke is released from its normally locked state. To this end, a lever 132 is secured to the top side of the yoke 114, by means of a bearing stud 134, and leads therefrom for connection with a linkage shaft 132' which, in turn, is connected to a second lever 136, with the latter connected by a clevis form of coupling 140 to a tubular spindle 142; the spindle being mounted for turning movements in a flanged bushing 148, seated in an opening in a suitable support S, located at the control station. The top end of the spindle 142 is provided with an enlarged solid head 144, which rests upon the flanged upper end of the bushing 148, and the spindle is secured against displacement from the bushing by means of a contractile collar 150, clamped about it by means of a bolt 152 and in abutted relation with the lower end of the bushing, or with a washer 154 interposed between it and the latter, substantially as shown in Figures 8 and 9. An operating handle 156 is pivoted, as at 158, in a slot 146, formed diametrically in the head 144, and is to be employed to turn the spindle 142, as required.

As before stated, the yoke 114 is normally locked against movement on the slide rods 124, 126, and to thereby secure the propeller blades 84 in adjusted positions, and this is accomplished by means of a lock bar or key 162, mounted for vertical sliding movement in the top portion 114a, of the yoke, with its lower end normally engaged with one of the locking slots 130, in the top surface of the slide rod 124. This locking bar 162 is to be actuated from the control station, by pivoted movements of the operating handle 156, which movements are transmitted therefrom by means of a link 164, depending from a pivoted connection 166 with the under side of the operating handle, the lower end of the link being pivoted, as at 168, medially of a short lever 170, that is pivoted, on a bolt 172, extending diametrically through the spindle 142. The lever 170 projects outwardly through a side opening adjacent the lower end of the spindle and has its outer end apertured to receive one end of a Bowden wire 174, which extends to and connects with one arm of a lever 176, pivoted in a bracket 178, mounted on the top portion 114a, of the yoke 114, the other arm of the lever having a pin and slot connection 180 with the locking bar 162; the latter being lifted from its engagement with a locking slot 130, of the slide rod 124, when the operating handle 156 is depressed on its pivot 158. An adjustable stop 160 is provided in the bottom of the slot 146, in the spindle head 144, to limit the movement of the operating hand, as occasion may require.

In operation, to adjust the pitch of the propeller blades 84, the operating handle 156 is depressed by the operator, when, due to the lever action of the handle on the pivot pin 158, an upward pull is exerted on the link 164 and is transmitted by the short lever 170 and the choke wire 174 to the lifting lever 176 (Figures 2 and 3), which acts to raise the locking bar 162 from its engagement with a locking slot 130, of the slide rod 124, thus freeing the yoke 114 for linear movement in either direction, fore or aft, on the latter and the slide rod 126. With the operating handle 156 in its depressed state, a rotary motion is imparted to it by the operator, to the right or left of a neutral position of setting, which position is designated at the center of a degree scale 148a, marked along the edge of the flange of the bushing 148; the head 144, of the spindle 142, having an index 144a marked on its edge for cooperation with the scale graduations, while the opposite ends of the scale are marked "A" and "F," respectively for the directions of linear movements of the control shaft 74. The rotating force of the handle 156 is imparted to the spindle 142 and is transmitted from it by the connections 140 and 138 to the lever 136, which is connected to an angled arm 132 (Figure 1) to convert it into a push-pull motion that is transmitted through the bearing stud 134 to the yoke 114; the movement of the latter, in turn, being transmitted to the control shaft 74 by the collar 104; the longitudinal slots 110, in the drive shaft 22, permitting of the movement of these elements relatively thereto. The drive shaft 22, the collar 104, and the control shaft 74, all rotate together, during propeller operation and are held in alinement at all times by the spline key 106. Movement of the control shaft 74, in either a fore or aft direction, imparts a required rotary motion to the pinions 78 and the spindles 80, changing the pitch of the propeller blades 84 accordingly. A spring 182 is carried by the bracket 178, on the top of the yoke 114, to return the lifting lever 176 to its normally inoperative position, when the locking bar 162 will again engage with a locking slot 130, of the slide rod 124; the spring acting concurrently with the movement of the operating handle 156 to its position of rest. In order to maintain the choke wire 174 in a proper operative relation with the lifting lever 176, it is enclosed within a sheath 174', which is clamped, as at 184, at several points along the lever and linkage connections between the controller 156 and the yoke actuating lever 176, substantially as shown in Figure 10, the wire being free to move through the sheath, when actuated from the controller as well as in adjusting itself to the movements of the yoke actuating linkage.

Preferably, the axis of the face area of each of the propeller blades 84 is aligned slightly off the center of its respective spindle axis, substantially as shown in Figure 7, in order to create a very slight thrust in a longitudinal direction on the control shaft 74. This thrust is created by the action of the slightly unbalanced blade through the water, as when applied to boats; or by the action of a blade through the air or other medium in which it operates, its purpose being to keep the lost motion in the assembly in one direction at all times during operation, thus leading to a more accurate adjustment and smoother operation of the entire drive mechanism, throughout its active use.

Without further description, it is believed to be obvious that the disclosed embodiment of my invention is not confined to boat applications only, but that it is generally applicable for commercial use, as an independent unit in conjunction with other mechanical assemblies, in aircraft, industrial mechanisms, or in any manner where its novel advantages may prove commercially useful in the handling, controlling, and processing of air, liquids, gases, powders, and similar materials; also, it is to be understood that changes in design and minor details of construction of its parts may be resorted to, within the limits defined by the scope of the appended claims.

What I claim is:

1. In a mechanism of the class described, a tubular drive shaft having opposed longitudinally extending slots located between its ends, a control shaft extending inwardly of an end of said drive shaft and operatively connected at its outer end with a mechanism to be controlled, a transmission case enclosing the slotted intermediate portion of said drive shaft, means slidable on said drive shaft within said transmission case and connecting said control shaft through said slots for the common rotation of the same and the drive shaft, other means connected with said slidable means and mounted for sliding movements relatively to said drive shaft and said transmission case, an anti-friction bearing carried by said other means and supporting the first named sliding means for the rotation thereof with said drive and control shafts, means for locking said other means to said transmission case to secure said control shaft in its positions of adjustment, and a remote control means interconnected with said other means and the locking means and operable to actuate the same one independently of the other, said means for locking said other means comprising a pair of fixed parallel rods extending longitudinally within said transmission case and supporting said other sliding means, one of said rods having a plurality of locking slots formed transversely thereof, and a movable locking element carried by said other sliding means and slidably adjustable on said rods and engageable with said locking slots.

2. In a mechanism of the class described, a drive shaft and a control shaft concentrically disposed relative to each other, said control shaft having an inner end, connecting means operatively connecting said inner end of said control shaft to said drive shaft for rotation therewith and longitudinal sliding movement relative thereto, said control shaft having an outer end operatively connected with mechanism to be controlled, a stationary transmission case enclosing said inner end of said control shaft, said connecting means and adjacent portions of said drive shaft, said connecting means including a collar concentrically of said shafts and formed with an annular groove, an actuating yoke rotatable in said groove, a slide rod fixed in said transmission case in spaced parallel relation to said shafts, said yoke being formed with an aperture slidably receiving said slide rod therein for slidably mounting said yoke on said rod, said rod being formed with a plurality of locking slots transversely thereof, a locking bar, means mounting said locking bar on said yoke for locking and unlocking movement into and out of said slots, remote control means interconnected with said locking bar and yoke, said remote control means being operative to move said locking bar into and out of a selected locking slot, and said remote control means also being operative to move said yoke, collar and control shaft longitudinally of said drive shaft when said locking bar is disengaged from said slots.

JOSEPH R. THOMPSON.

REFERENCES CITED

The following references are of record in the file of this patent:

UNITED STATES PATENTS

| Number | Name | Date |
|---|---|---|
| 573,977 | Hubbard | Dec. 29, 1896 |
| 1,169,898 | Wilcox | Feb. 1, 1916 |
| 1,542,083 | Nixon | June 16, 1925 |
| 1,600,932 | Clem | Sept. 21, 1926 |
| 1,740,725 | Brown | Dec. 24, 1929 |
| 1,806,325 | Wooden | May 19, 1931 |
| 1,940,433 | Nelson | Dec. 19, 1933 |
| 1,943,057 | Bush | Jan. 9, 1934 |
| 2,242,542 | Peterson | May 20, 1941 |
| 2,279,633 | Merickle | Apr. 14, 1942 |

FOREIGN PATENTS

| Number | Country | Date |
|---|---|---|
| 43,046 (Addition) | France | Nov. 7, 1933 |
| 470,828 | Great Britain | Aug. 23, 1937 |